US005149901A

United States Patent [19]

Boor et al.

[11] Patent Number: 5,149,901

[45] Date of Patent: Sep. 22, 1992

[54] GUITAR SUPPORT APPARATUS

[76] Inventors: Mark C. Boor; Celeste Boor, both of 682 N. Star Rte., Questa, N. Mex. 87556

[21] Appl. No.: 705,950

[22] Filed: May 28, 1991

[51] Int. Cl.[5] ........................ G10G 5/00; F16M 11/00

[52] U.S. Cl. ........................ 84/327; 248/443; 248/167

[58] Field of Search ............... 84/327, 477 R; 211/17, 211/21, 42; 248/441.1, 443, 444, 694, 176; D12/115; 220/520, 308, 310

[56] References Cited

U.S. PATENT DOCUMENTS

| | | | |
|---|---|---|---|
| 3,785,500 | 1/1974 | Kennelly | 211/21 |
| 4,099,441 | 6/1978 | Landon | 84/327 |
| 4,352,480 | 10/1982 | Gathright | 84/327 |
| 4,582,282 | 4/1986 | Gracie | 84/327 |
| 4,693,161 | 9/1987 | Uhrig | 84/327 |
| 4,943,021 | 7/1990 | Cien et al. | 84/327 |
| 4,986,158 | 1/1991 | Johnson | 84/327 |
| 5,074,420 | 12/1991 | Cappel, III | 211/42 |

*Primary Examiner*—William M. Shoop, Jr.
*Assistant Examiner*—Helen Kim
*Attorney, Agent, or Firm*—Leon Gilden

[57] ABSTRACT

A guitar support apparatus is arranged to include a plurality of spaced tubular rails, with a first and second "U" shaped brace arranged parallel relative to one another, and each mounted to the right and left tubular rail to space the right and left tubular rails in a parallel relationship. The first brace includes a plurality of cylindrical cushions mounted about the rails to accommodate a guitar member mounted between the first and second "U" shaped brace, and includes spaced cushion pads on the tubular rails to receive the guitar thereon. A plurality of projection bosses and associated caps are arranged to position and maintain the guitar within the organization.

2 Claims, 4 Drawing Sheets

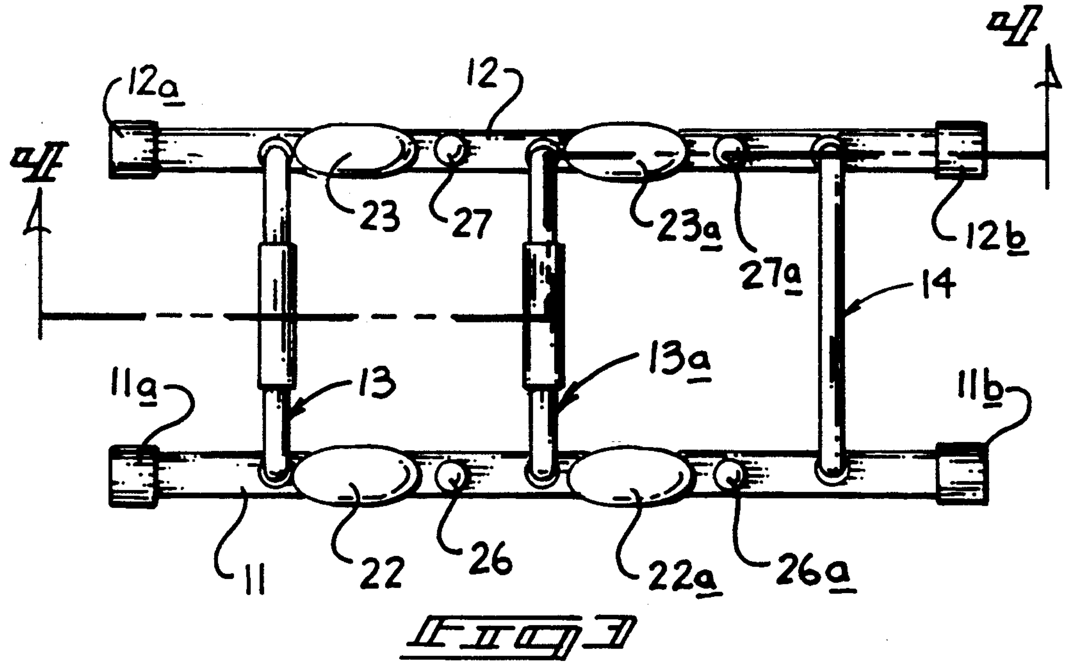
FIG 3
FIG 4
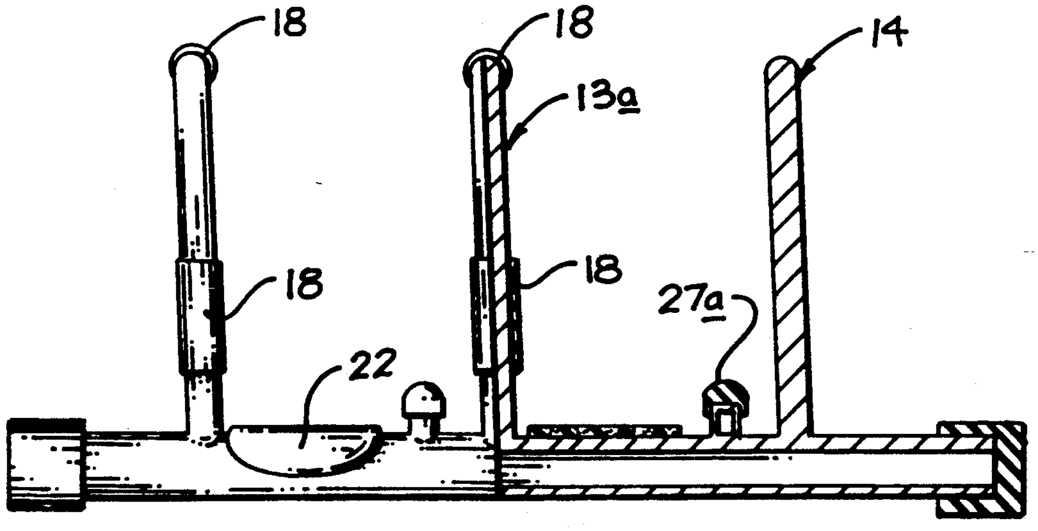

GUITAR SUPPORT APPARATUS

BACKGROUND OF THE INVENTION

1. Field of the Invention

The field of invention relates to support apparatus, and more particularly pertains to a new and improved guitar support apparatus wherein the same is arranged to position and secure guitar members in a secured and stable relationship thereon.

2. Description of the Prior Art

Various support apparatus is utilized for maintaining instruments in a stable relationship to minimize damage and abrasion to the instruments during periods of non-use. Examples of prior art support rack apparatus is exemplified in U.S. Pat. No. 4,352,480 to Gathright wherein a support stand mounts a plurality of guitars formed of multiple linkages to secure a guitar upon one of a plurality of pairs foldable linkages.

U.S. Pat. No. 4,693,161 to Uhrig sets forth an apparatus for supporting an instrument utilizing a plurality of pegs mounted in a triangular relationship to a rear surface of a guitar for positioning the guitar in an upright position.

U.S. Pat. No. 4,099,441 to Landon sets forth a wire loop guitar support arrangement utilizing spaced arms to receive a guitar therewithin.

As such, it may be appreciated that there continues to be a need for a new and improved guitar support apparatus as set forth by the instant invention which addresses both the problems of ease of use as well as effectiveness and simplicity in construction and in this respect, the present invention substantially fulfills this need.

SUMMARY OF THE INVENTION

In view of the foregoing disadvantages inherent in the known types of guitar support apparatus now present in the prior art, the present invention provides a guitar support apparatus wherein the same utilizes spaced rails mounting forward and rear loops adjacent each guitar to position the guitar therewithin. As such, the general purpose of the present invention, which will be described subsequently in greater detail, is to provide a new and improved guitar support apparatus which has all the advantages of the prior art guitar support apparatus and none of the disadvantages.

To attain this, the present invention provides a guitar support apparatus arranged to include a plurality of spaced tubular rails, with a first and second "U" shaped brace arranged parallel relative to one another, and each mounted to the right and left tubular rail to space the right and left tubular rails in a parallel relationship. The first brace includes a plurality of cylindrical cushions mounted about the rails to accommodate a guitar member mounted between the first and second "U" shaped brace, and includes spaced cushion pads on the tubular rails to receive the guitar thereon. A plurality of projection bosses and associated caps are arranged to position and maintain the guitar within the organization.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved guitar support apparatus which has all the advantages of the prior art guitar support apparatus and none of the disadvantages.

It is another object of the present invention to provide a new and improved guitar support apparatus which may be easily and efficiently manufactured and marketed.

It is a further object of the present invention to provide a new and improved guitar support apparatus which is of a durable and reliable construction.

An even further object of the present invention is to provide a new and improved guitar support apparatus which is susceptible of a low cost of manufacture with regard to both materials and labor, and which accordingly is then susceptible of low prices of sale to the consuming public, thereby making such guitar support apparatus economically available to the buying public.

Still yet another object of the present invention is to provide a new and improved guitar support apparatus which provides in the apparatuses and methods of the prior art some of the advantages thereof, while simultaneously overcoming some of the disadvantages normally associated therewith.

Still another object of the present invention is to provide a new and improved guitar support apparatus wherein the same utilizes brush members mounted to each top rail of "U" shape support members to effect cleaning of frets and the like of excess debris to maintain the musical efficiency.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic top view of the invention, as set forth in FIG. 2.

FIG. 4 is an orthographic view, taken along the lines 4—4 of FIG. 3 in the direction indicated by the arrows.

DESCRIPTION OF THE PREFERRED EMBODIMENT

Figure 1:
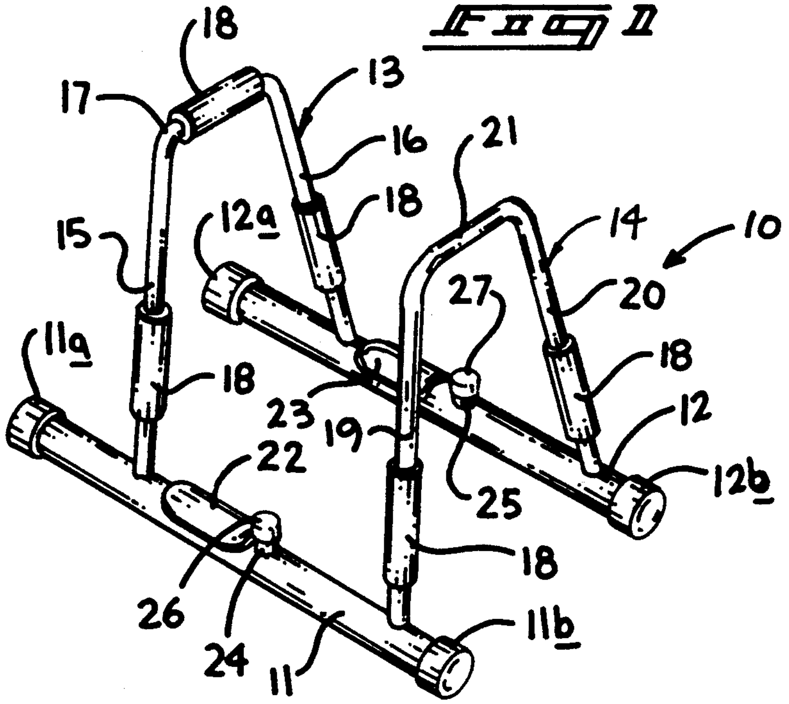
FIG. 1 is an isometric illustration of the instant invention.

With reference now to the drawings, and in particular to FIGS. 1 to 7 thereof, a new and improved guitar support apparatus embodying the principles and concepts of the present invention and generally designated by the reference numeral 10 will be described.

Figure 2:
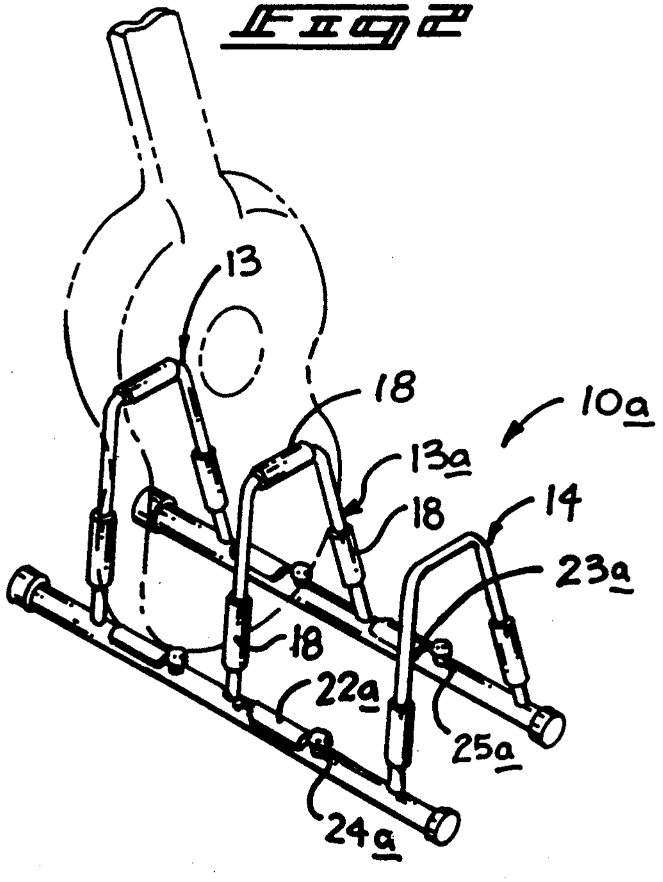
FIG. 2 is a further example of the instant invention for mounting a plurality of guitars.

More specifically, the guitar support apparatus 10 of the instant invention essentially comprises the use of a right tubular rail 11 spaced from and parallel a left tubular rail 12. Each tubular rail includes an end cap defined by a right rear and forward end cap **11*a* and 11*b*, with a left rail 12 including a left rear and forward end cap 12*a* and 12*b* to provide enclosure of the internal cavity of each tubular rail for use in storage of various devices, such as guitar strings, cleaning rags, and the like. A first "U" shaped brace 13 is fixedly mounted to the right and left tubular rails, including a first brace right leg 15 orthogonally mounted to an axis of the right tubular rail 11, and a first brace left leg 16 orthogonally mounted to an axis of the left tubular rail 12. A first brace top leg 17 joins the uppermost portions of the right and left legs 15 and 16. Cylindrical cushions 18 are mounted medially of the right, left, and top legs 15, 16, and 17 of the first brace for receiving a guitar member thereagainst, as illustrated in FIG. 2 for example. A second "U" shaped brace 14 arranged parallel to the first brace includes a second brace right leg 19, a second brace left leg 20, and a second brace top leg 21. The second "U" shaped brace 14 forms a forward brace of the organization, and does not require a cylindrical cushion about the second brace top leg 21 to permit ease of manual grasping of the second brace top leg 21 for manipulation of the organization in an assembled configuration. A right cushion pad 22 is mounted adjacent the first brace leg, while a left cushion pad 23 is mounted to a top surface of the leg tubular 12 adjacent the first brace left leg 16. Positioned adjacent a forward end of the right and left cushion pads 22 and 23 are respective right and left projection bosses 24 and 25 each mounting respective right and left boss caps 26 and 27** at an upper terminal end thereof for receiving and positioning of a guitar member thereon.

The modified apparatus **10*a*, as illustrated in FIG. 2, utilizes a third "U" shaped brace 13*a* interposed between the first and second "U" shaped braces 11 and 12 to permit positioning of a plurality of guitars within the rack structure, wherein the third "U" shaped brace 13*a* utilizes respective further right and left cushion pads 22*a* and 23*a* in cooperation with further projection bosses 24*a* and 25*a* and their associated caps 26*a* and 27*a***.

Figure 5:
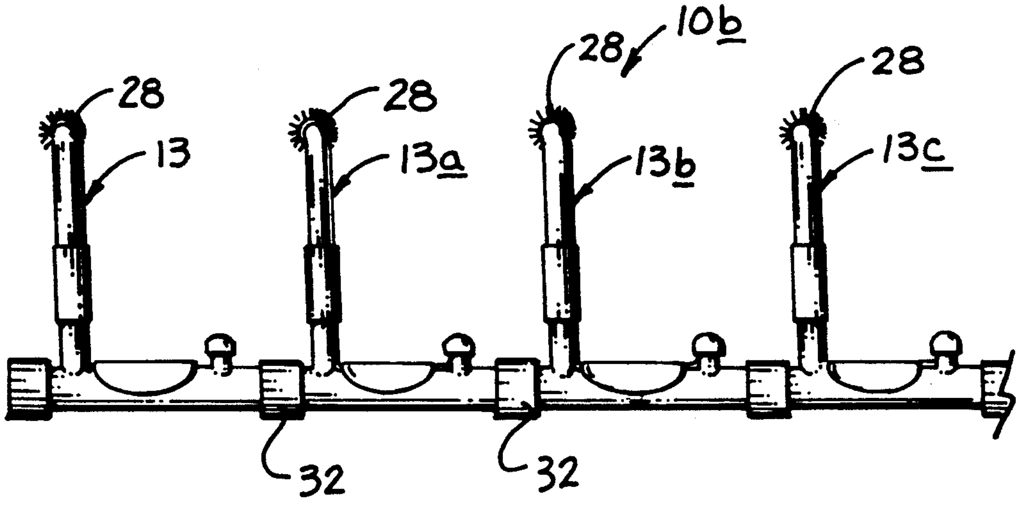
FIG. 5 is an orthographic side view of a further modified aspect of the instant invention.
Figure 6:
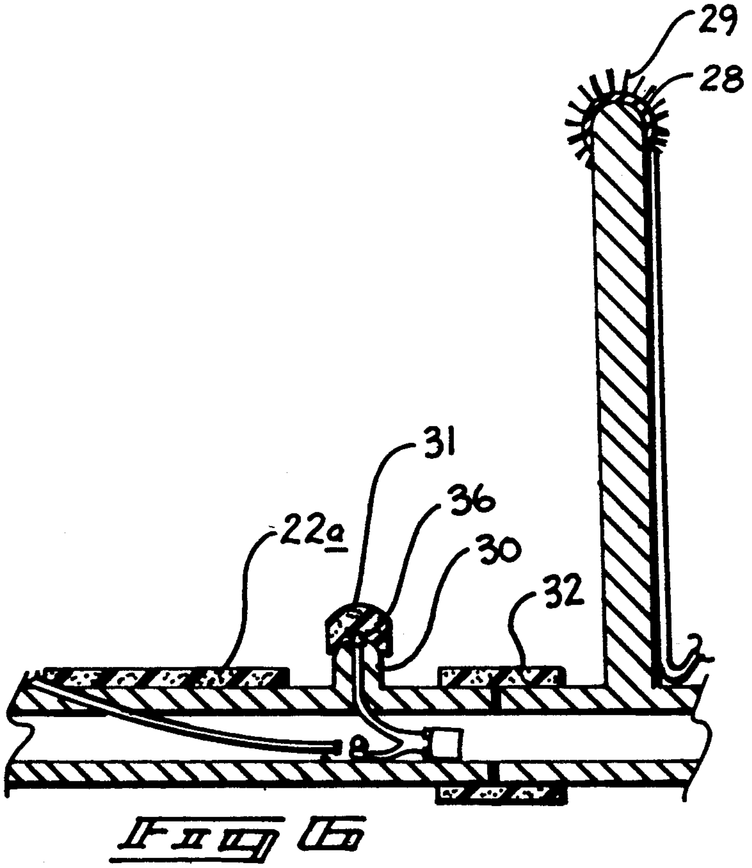
FIG. 6 is an orthographic cross-sectional configuration of the modified invention as set forth in FIG. 5.
Figure 7:
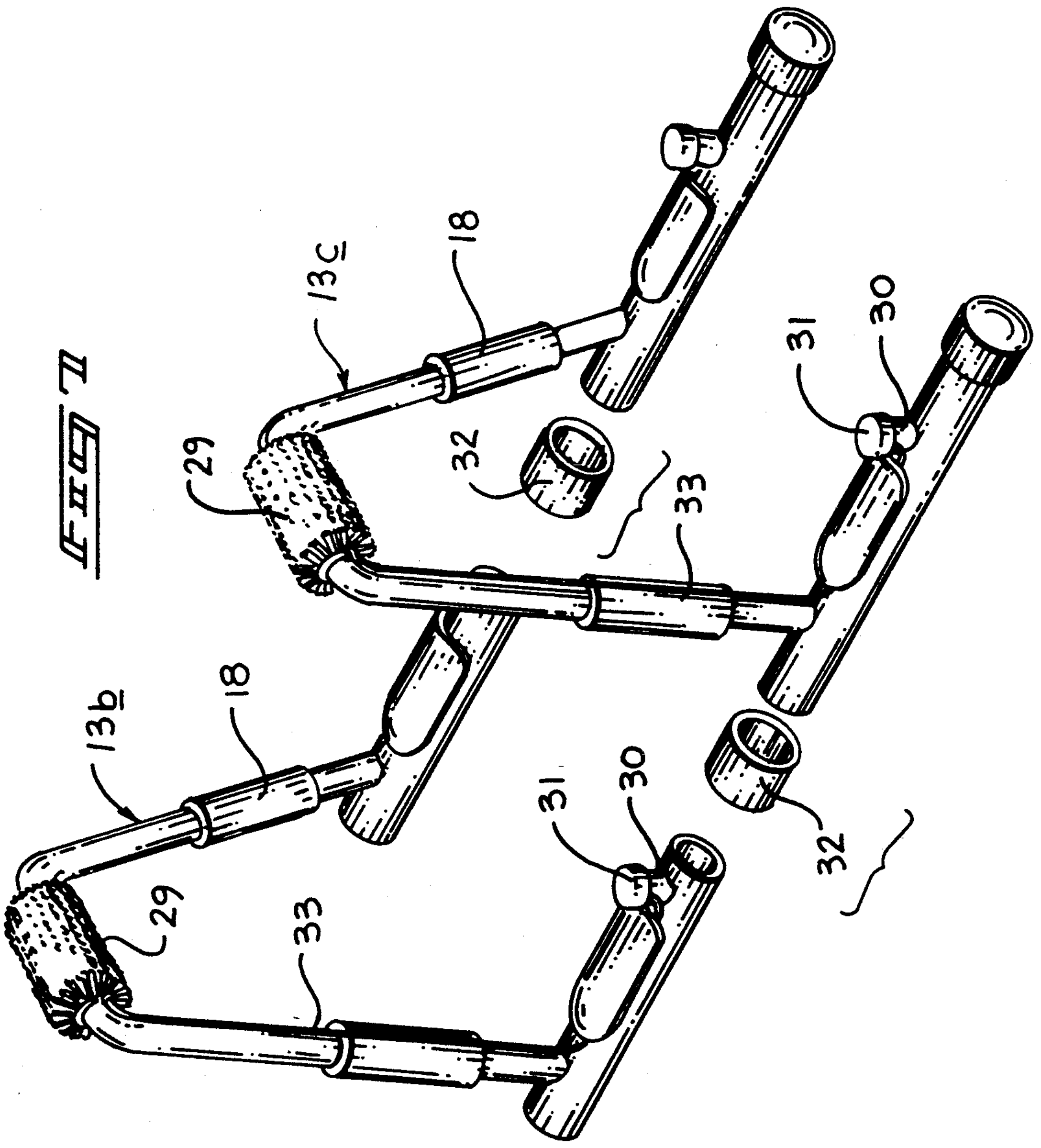
FIG. 7 is an exploded isometric illustration of the modified guitar support apparatus of the instant invention.

The modified invention setting forth the guitar support apparatus **10*b*, as illustrated in FIGS. 5, 6, and 7 for example, utilizes a bristle brush matrix 29 mounted about modified cylindrical cushions 28 secured to each top leg of each "U" shaped brace. The bristle matrix 29 of each modified cylindrical cushion 28 is arranged to permit cleaning of guitar frets and strings by merely directing the frets and strings across the brush prior to a subsequent positioning of the guitar structure between the projection bosses and a respective "U" shaped brace. Further, the organization permits assemblage of additional "U" shaped braces, such as a fourth "U" shaped brace 13*b*, a fifth "U" shaped brace 13*c*, etc. by utilizing junction sleeves 32 joining respective forward terminal ends of right and left tubular rails of each unit of the apparatus defined by a "U" shaped brace, a plurality of cushion pads, and associated projection bosses. Further, as illustrated in FIG. 6, the structure may employ a pressure sensitive switch 36 mounted in cooperation with the modified projection boss cap 31 when the projection boss cap 31 is compressible, whereupon positioning of a guitar thereon depresses a switch 36 and completes a circuit to effect illumination of an illumination bulb 34. The illumination bulb 34 is operative through the battery 35 and effects illumination through a fiber optic cable 33 that is directed from interiorly of the right tubular rail and extends exteriorly thereof along the exterior surface of an associated "U" shaped brace to effect illumination of the "U" shaped brace when a guitar member is not properly positioned upon the associated modified projection boss cap 31. This directs an individual to properly position the guitar until illumination of the fiber optic cable indicating proper alignment of an associated guitar upon the projection bosses 30** and the associated cushion pads.

As to the manner of usage and operation of the instant invention, the same should be apparent from the above disclosure, and accordingly no further discussion relative to the manner of usage and operation of the instant invention shall be provide.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A guitar support apparatus comprising, a guitar support unit, wherein the guitar support unit includes a right tubular rail spaced from and parallel a left tubular rail, and a "U" shaped brace mounted to the right and left tubular rails, the "U" shaped brace including a right leg fixedly mounted to the right tubular rail orthogonally oriented relative to the right axis defined by the right tubular rail, and the "U" shaped brace including a left leg fixedly mounted to the left tubular rail and orthogonally oriented relative to a left axis defined by the left tubular rail, and the "U" shaped brace including a top leg equally joined to upper terminal ends of the right and left legs, wherein the top leg, the left leg, and the right leg each include a cylindrical cushion wound thereabout, and a plurality of units securable together in an aligned relationship, wherein each "U" shaped brace of each unit is arranged parallel relative to one another, and including a right junction sleeve joining each right tubular rail of each unit in a coaxially aligned relationship relative to one another and a left junction sleeve joining in a coaxially aligned relationship left tubular rails of adjacent units together, and each right and left tubular rail includes a respective right and left cushion pad mounted to a top surface of each rail adjacent each respective right and left leg, and each right and left rail includes a respective right and left projection boss fixedly mounted relative to each respective right and left tubular rail, wherein each projection boss is positioned to receive a guitar member thereon, and each top leg of each "U" shaped brace of each unit includes a bristle matrix mounted about each cylindrical cushion mounted to each top leg to permit cleaning of fret and guitar string portions of a guitar member.

2. The guitar support apparatus as set forth in claim 1 wherein at least one said projection boss includes a compressible projection boss cap mounted thereon, and the compressible projection boss cap mounts a pressure sensitive switch in contiguous contact therewith, the pressure sensitive switch maintained in a first closed position in absence of a guitar positionable upon the projection boss cap, and an illumination bulb mounted within one of said tubular rails underlying the switch, and battery means in cooperation with the illumination bulb and switch to effect illumination of the bulb upon the switch effected to a second closed position upon a guitar member positioned upon the compressible projection boss cap, and a fiber optic cable positioned adjacent the illumination bulb and directed about each "U" shaped brace to effect visual illumination of the fiber optic cable indicating proper positioning of the guitar upon the projection boss cap.

* * * * *